UNITED STATES PATENT OFFICE.

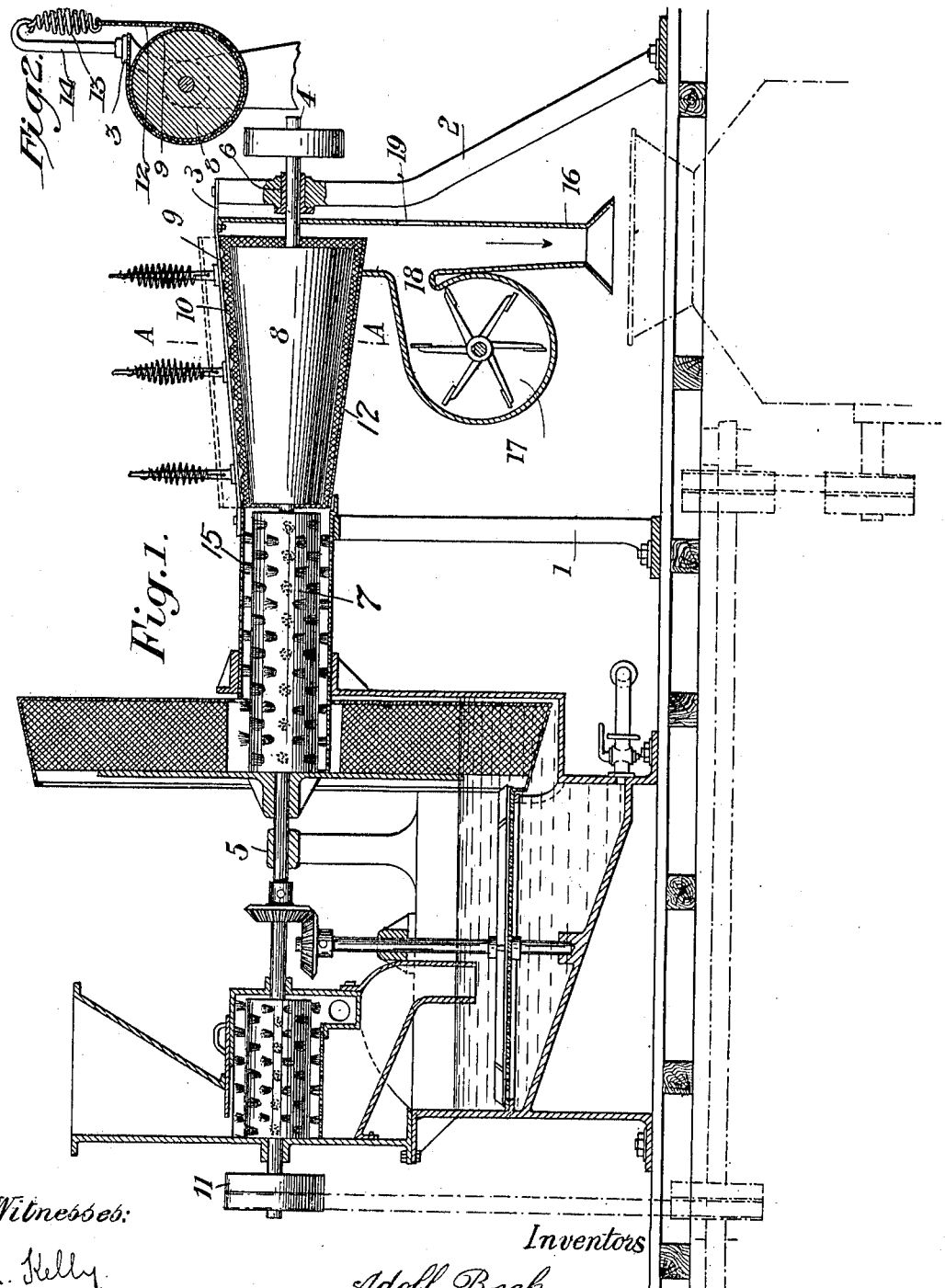

ADOLF BECK AND EDUARD ANGERMÜLLER, OF COBURG, GERMANY.

APPARATUS FOR SCOURING GRAIN.

984,504.  Specification of Letters Patent.  Patented Feb. 14, 1911.

Original application filed October 28, 1908, Serial No. 459,926. Divided and this application filed November 22, 1909. Serial No. 529,196.

*To all whom it may concern:*

Be it known that we, ADOLF BECK and EDUARD ANGERMÜLLER, both subjects of the German Emperor, and both residing at Coburg, Germany, have invented certain new and useful Improvements in Apparatus for Scouring Grain, of which the following is a specification.

This invention relates to an apparatus for scouring grain and more especially to an apparatus of this kind which will be suitable for carrying out the process for treating grain forming the subject matter of the United States Patent Serial No. 459,926, of which the present patent is a division.

The subject of this invention is to provide a simple and efficient apparatus comprising means for scouring grain so as to remove therefrom only the husk while leaving the grain proper quite untouched which result is possible owing to the fact that the grains have been moistened with water having only a temperature of 8 to 10 degrees C. so as to only impregnate the husks and that these moistened grains have been deprived from the excess of moisture adhering to their outside.

The invention has still for its object to provide means whereby an elastic scouring pressure is exerted on said grains.

In the accompanying drawings: Figure 1 shows a longitudinal side elevation view of the scouring apparatus, parts of which are shown in vertical section; Fig. 2 is a vertical transverse section on line A—A of Fig. 1.

The scouring apparatus comprises a framework formed of two uprights 1 and 2 connected together at their top by means of a bar 3. A shaft 4 journaled in suitable bearings 5 and 6 carries a conveying brush drum 7 and in line with the latter a conical drum 8 which is coated with a coating of india rubber 9. The latter is provided on its outside with corrugations or flutings 10. The shaft 4 is driven at a suitable speed by any desired means such as a pulley 11. The drum 8 is surrounded by a sieve mantle 12 made of wire gauze and secured at one of its edges to the bar 3 connecting the uprights 1 and 2, the opposite edge of the mantle being suspended on the opposite side of the drum 8 from a plurality of coiled springs 13 which are fixed thereto at their lower ends while their upper ends are secured to corresponding brackets 14 carried by the connecting bar 3. These springs 13 are provided with means for controlling the tension thereof. The sieve mantle 12 communicates at its feed end with a foraminated drum 14 carried by the upright 1 and inclosing the conveying brush drum. The delivery end of the sieve mantle 12 opens out into a hopper 16 through which a blower 17 is adapted to blow an air current entering through opening 18 and escaping through opening 19.

The function of this scouring apparatus is as follows: The grain which has previously been moistened to a suitable degree and afterward dried on its outside is delivered by the conveying brush drum 7 into the feed end of the sieve mantle 12 and is gradually conveyed toward the discharge end of the latter by the rotation of the conical drum 8. During this motion the grain is squeezed between the fluted india rubber coating 9 of the drum 8 and the sieve mantle. The controllable spring suspension of the mantle allows of the squeezing pressure to which the grains are subjected between the mantle and the roller being determined in such a manner, that no squashing or pressing of the grain takes place but only a slight rubbing. It follows therefrom that only the husks are rubbed off in small scales without the grains proper being in the least injured.

The husk scales rubbed off, fall through the sieve mantle 12 while the grains deprived from their husks fall into the hopper 16 and during the fall of the grains in the latter the husk particles which might still adhere to the grains are blown away by the blower 17 and escape through the opening 19. As readily seen the grains are thus thoroughly cleaned and entirely freed from their husks and are ready for grinding.

Having now fully described our said invention what we claim and desire to secure by Letters Patent, is:—

1. An apparatus for scouring grain which has been previously moistened and dried on its outside, comprising in combination a drum, coated with corrugated india-rubber, means for rotating said drum, a wire gauze sieve mantle surrounding said drum, means for yieldingly applying said wire gauze mantle against the said india-rubber cover, means for conveying the grain to be treated between the said india rubber coated drum and the said sieve mantle, the arrangement of the latter being such that it only slightly squeezes the grains and removes the husks therefrom by rubbing without injuring the grain proper wholly by rotation of the drum, substantially as and for the purpose set forth.

2. An apparatus for scouring grain which has been previously moistened and dried on its outside comprising in combination a framework, a shaft journaled in said framework, means for driving the said shaft, a conical drum carried by said shaft, a corrugated india-rubber coating secured to said drum, a wire gauze sieve mantle surrounding the said drum, this sieve mantle being secured at one end of its edges to a stationary part of said framework and at its opposite edge on the other side of the said drum to a plurality of springs, a corresponding number of brackets carried by the said framework and having the other ends of said springs attached to them and means for conveying the grain to be scoured between the said india-rubber coated conical drum at the smaller end of the latter and the said sieve mantle, the arrangement being such that the latter only slightly squeezes the grains and removes the husks therefrom by rubbing without injuring the grain proper, substantially as and for the purpose set forth.

3. An apparatus for husking and scouring grain which has been previously moistened, and dried on its surface, comprising in combination, a drum having a yielding corrugated periphery, means for rotating the drum, a wire gauze mantle embracing the periphery of the drum and between which and the drum the grain is fed, and a plurality of yieldingly acting devices connected with the mantle at spaced points for engaging the mantle with the interposed grain with sufficient pressure to remove the husk and polish the grain wholly by rotation of the drum.

In testimony whereof we have hereunto set our hands in presence of two witnesses.

ADOLF BECK.
EDUARD ANGERMÜLLER.

Witnesses:
OTTO FRANK,
HEINRICH RAHN.